(12) United States Patent
Khakimyanov et al.

(10) Patent No.: US 10,445,153 B2
(45) Date of Patent: Oct. 15, 2019

(54) TECHNOLOGIES FOR MANAGING WEB NOTIFICATIONS IN CLIENT-SERVER SYSTEMS

(71) Applicant: Ingram Micro Inc., Irvine, CA (US)

(72) Inventors: Timur Khakimyanov, Lobnya (RU); Igor Vagulin, Dolgoprudny (RU)

(73) Assignee: Ingram Micro, Inc., Irvine, CA (US)

( * ) Notice: Subject to any disclaimer, the term of this patent is extended or adjusted under 35 U.S.C. 154(b) by 286 days.

(21) Appl. No.: 15/639,141

(22) Filed: Jun. 30, 2017

(65) Prior Publication Data

US 2019/0004876 A1 Jan. 3, 2019

(51) Int. Cl.
*G06F 15/16* (2006.01)
*G06F 9/54* (2006.01)
*H04L 29/06* (2006.01)
*H04L 29/08* (2006.01)

(52) U.S. Cl.
CPC ........ *G06F 9/542* (2013.01); *H04L 29/06047* (2013.01); *H04L 67/02* (2013.01); *H04L 67/26* (2013.01); *H04L 69/161* (2013.01)

(58) Field of Classification Search
CPC ... G06F 9/542; H04L 29/06047; H04L 67/02; H04L 67/26; H04L 69/161
USPC ........................................ 709/203, 206, 207
See application file for complete search history.

(56) References Cited

U.S. PATENT DOCUMENTS

| | | | | |
|---|---|---|---|---|
| 9,648,052 | B2 * | 5/2017 | Gangadharan | H04L 65/1006 |
| 2012/0185561 | A1 * | 7/2012 | Klein | H04L 67/2814 709/217 |
| 2014/0129661 | A1 * | 5/2014 | Thyagaraja | G06F 9/542 709/207 |
| 2015/0100664 | A1 * | 4/2015 | Flack | H04L 67/28 709/213 |
| 2015/0358263 | A1 * | 12/2015 | Bertin | G06F 9/54 709/206 |
| 2017/0180463 | A1 * | 6/2017 | Wang | H04L 29/06 |

\* cited by examiner

*Primary Examiner* — Liang Che A Wang
*Assistant Examiner* — Kaylee J Huang
(74) *Attorney, Agent, or Firm* — Ice Miller LLP (57) ABSTRACT

Technologies for managing web notifications between a web browser and an application integration in a client-server system include a web notification management platform configured to manage web notifications to a hierarchy of users (i.e., via the web browser) about operation state change events of the application integration. To do so, the web notification management platform is configured to create a notification channel and identify a message selector to be associated with the notification channel based on a dimensional channel hierarchy determined as a function of a user for which the notification channel is being created. Accordingly, the message selector can be used to rout web notifications to the appropriate notification channel and to the applicable web browser(s) via a long poll topic subscription or a websocket connection. Additional embodiments are described herein.

20 Claims, 7 Drawing Sheets

TECHNOLOGIES FOR MANAGING WEB NOTIFICATIONS IN CLIENT-SERVER SYSTEMS

BACKGROUND OF THE DISCLOSED EMBODIMENTS

Independent software vendors (ISVs) develop and sell software applications which are typically designed to run on one or more computer hardware or operating system platforms. Such software applications range from basic utility or productivity enhancing application to business process application for enterprises (e.g., customer relationship management (CRM), enterprise resource planning (ERP), automation tools, etc.). As cloud computing has become more pervasive, one such method of delivering software has been via the cloud using a software as a service (SaaS) based model. Using this delivery method, the ISVs may sell their software applications, or subscriptions to their software applications, through a public cloud or cloud marketplace.

While the cloud marketplace provides an online storefront for customer access to cloud-based services and software applications, a cloud service broker may be used to facilitate the transaction between the ISV and an end user, reseller, retailer, etc. While cloud service brokers serve as a platform to integrate the different cloud-based services and software applications into a single portal, they rely on web notifications to transmit and receive communications between highly distributed components, such as a payment gateway, $3^{rd}$ party cloud services, fraud protection services, etc. Present web notification systems include cloud-based systems and self-hosted systems. However, each solution presents its own set of problems. For example, in cloud-based solutions, the possibility exists that sensitive information may have to be passed through external servers, which may not be legal in certain jurisdictions. In self-hosted solutions, for example, additional components are typically required to be installed to aggregate messages and achieve horizontal scalability, which can complicate server-side deployment of a web-based application.

In addition, one of the more challenging aspects of web notification systems is in achieving low per notification and per browser session overhead. For example, a server with 1,000 messages per second has roughly 1 ms to process each message, which generally requires an effective server side diff aggregation and batch delivering to clients. Accordingly, there exists a need for improvements in technologies for managing web notifications in client-server systems.

SUMMARY OF THE DISCLOSED EMBODIMENTS

In one aspect, a method for managing web notifications between a web browser and an application integration in a client-server system includes creating, by a web notification management platform, a notification channel at the web notification management platform in response to having received a notification channel request from the web browser of an end user computing device; setting, by the web notification management platform, a notification channel state of the notification channel to indicate the notification channel state is in a new state; identifying, by the web notification management platform, a message selector to be associated with the notification channel, wherein the message selector is based on a dimensional channel hierarchy determined as a function of a user for which the notification channel is being created, and wherein the message selector is usable to rout web notifications to the notification channel; creating, by the web notification management platform, a long poll topic subscription as s function of the message selector; receiving, by the web notification management platform, a websocket connection request from the web browser; and transmitting, by the web notification management platform, an indication of whether the websocket connection request has been accepted.

In some embodiments, the method further includes setting, by the web notification management platform and in response to a determination that the websocket connection request has been accepted, the notification channel state to indicate the notification channel state is in a websocket state; and transmitting, by the web notification management platform, to the web browser, a websocket acceptance response that indicates the websocket connection request has been accepted.

In some embodiments, the method additionally includes transmitting, by the web notification management platform, a notification channel creation response indicating the notification channel has been successfully created. In other embodiments, creating the notification channel includes generating a notification channel identifier usable to identify the notification channel and wherein transmitting the notification channel creation response includes transmitting the notification channel identifier.

In some embodiments, the method further includes transmitting, by the web notification management platform, to the web browser, a websocket acceptance response that indicates the websocket connection request has not been accepted; receiving, by the web notification management platform, a long poll request; and setting, by the web notification management platform and in response to a determination that the websocket connection request has been accepted, the notification channel state to indicate the notification channel state is in a long poll state.

In some embodiments, the method further includes receiving, by the web notification management platform, a message from the application integration; writing, by the web notification management platform, the received message to a message database of the web notification management platform; writing, by the web notification management platform, the received message to a long poll topic; and writing, by the web notification management platform, the received message to a websocket queue. In other embodiments, the message comprises a web notification indicating an operation state change event performed by the application integration.

In some embodiments, the method further includes receiving, by the web notification management platform, a notification request from the web browser; determining, by the web notification management platform and as a function of the message selector, whether the long poll topic includes one or more messages received from the application integration; reading, by the web notification management platform and in response to a determination that the long poll topic includes the one or more messages, the one or more messages from the long poll topic; and transmitting, by the web notification management platform, a response to the web browser that includes the one or more messages. In other embodiments, the method further includes transmitting, by the web notification management platform and in response to a determination that the long poll topic does not include the one or more messages, a response to the web browser that is empty.

In some embodiments, the method additionally includes receiving, by the web notification management platform, a websocket message from the application integration; queueing, by the web notification management platform, the websocket message in a websocket queue; retrieving, by the web notification management platform, the websocket message from the websocket queue; retrieving, by the web notification management platform, a list of notification channels associated with a message selector of the websocket message; determining, by the web notification management platform, whether a notification channel state of at least one notification channel of the list of notification channels is in a new state; and writing, by the web notification management platform and in response to having determined that not one notification channel of the list of notification channels is in the new state, the received websocket message to the each notification channel of the list of notification channels.

In some embodiments, the method further includes requeueing, by the web notification management platform and in response to having determined that at least one notification channel of the list of notification channels is in the new state, the received websocket message to the websocket queue.

In another aspect, a web notification management platform for managing web notifications between a web browser and an application integration. The web notification management platform includes one or more computer-readable medium comprising instructions; and one or more processors coupled with the one or more computer-readable medium and configured to execute the instructions to create a notification channel at the web notification management platform in response to having received a notification channel request from the web browser of an end user computing device; set a notification channel state of the notification channel to indicate the notification channel state is in a new state; identify a message selector to be associated with the notification channel, wherein the message selector is based on a dimensional channel hierarchy determined as a function of a user for which the notification channel is being created, and wherein the message selector is usable to rout web notifications to the notification channel; create a long poll topic subscription as a function of the message selector; receive a websocket connection request from the web browser; and transmit an indication of whether the websocket connection request has been accepted.

In some embodiments, the one or more processors are further configured to execute the instructions to set, in response to a determination that the websocket connection request has been accepted, the notification channel state to indicate the notification channel state is in a websocket state; and transmit, to the web browser, a websocket acceptance response that indicates the websocket connection request has been accepted.

In some embodiments, the one or more processors are further configured to execute the instructions to transmit a notification channel creation response indicating the notification channel has been successfully created. In other embodiments to create the notification channel includes to generate a notification channel identifier usable to identify the notification channel and wherein to transmit the notification channel creation response includes to transmit the notification channel identifier.

In some embodiments, the one or more processors are further configured to execute the instructions to transmit, to the web browser, a websocket acceptance response that indicates the websocket connection request has not been accepted; receive a long poll request; and set the notification channel state to indicate the notification channel state is in a long poll state. In other embodiments, the one or more processors are further configured to execute the instructions to receive a message from the application integration; write the received message to a message database of the web notification management platform; write the received message to a long poll topic; and write the received message to a websocket queue.

In some embodiments, the message comprises a web notification to indicate an operation state change event performed by the application integration. In other embodiments, the one or more processors are further configured to execute the instructions to receive a notification request from the web browser; determine, as a function of the message selector, whether the long poll topic includes one or more messages received from the application integration; read, in response to a determination that the long poll topic includes the one or more messages, the one or more messages from the long poll topic; and transmit a response to the web browser that includes the one or more messages. In other embodiments, the one or more processors are further configured to execute the instructions to transmit, in response to a determination that the long poll topic does not include the one or more messages, a response to the web browser that is empty.

In some embodiments, the one or more processors are further configured to execute the instructions to receive a websocket message from the application integration; queue the websocket message in a websocket queue; retrieve the websocket message from the websocket queue; retrieve a list of notification channels associated with a message selector of the websocket message; determine whether a notification channel state of at least one notification channel of the list of notification channels is in a new state; and write, in response to having determined that not one notification channel of the list of notification channels is in the new state, the received websocket message to the each notification channel of the list of notification channels.

In some embodiments, the one or more processors are further configured to execute the instructions to requeue, in response to having determined that at least one notification channel of the list of notification channels is in the new state, the received websocket message to the websocket queue.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
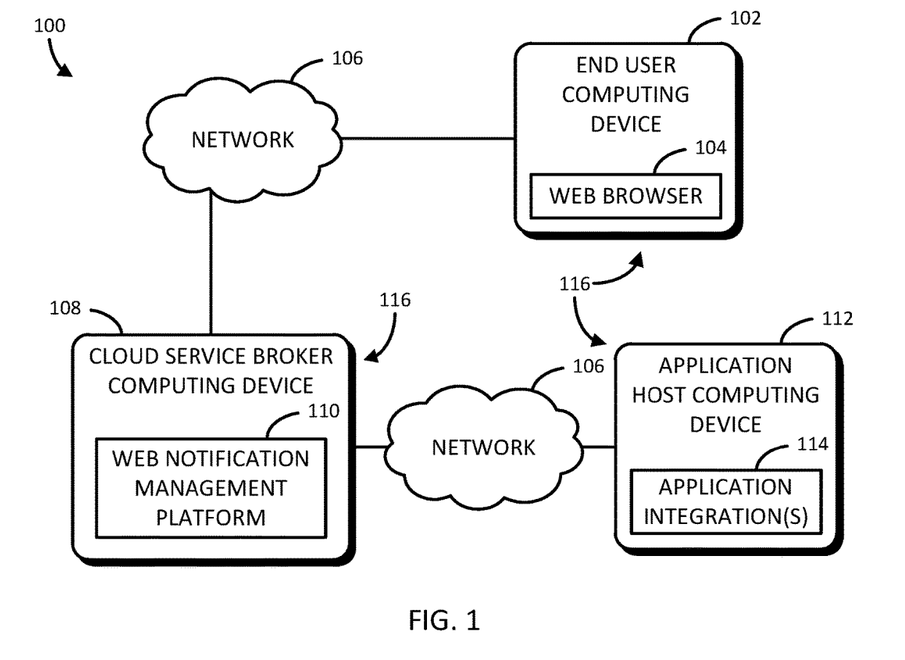
FIG. 1 is a block diagram of an illustrative embodiment of a client-server system for managing web notifications that includes an end user computing device and an application host computing device communicatively coupled to a service broker computing device.

FIG. 1 illustrates a client-server system 100 for managing web notifications that includes an end user computing device 102 and an application host computing device 112, each of which are communicatively coupled to a cloud service broker computing device 108 via a network 106. In use, as will be described in further detail below, the cloud service broker computing device 108 receives a request from a web browser (e.g., the web browser 104) of the end user computing device 102 to open a notification channel, such that notifications between an integration of a cloud-based application (e.g., one of the application integrations 114) and the web browser can be managed by the cloud service broker computing device 108, or more particularly a web notification management platform 110 of the cloud service broker computing device 108, via the notification channel.

Upon receiving the request, the web notification management platform 110 is configured to create the notification channel, as well as a long poll topic subscription and a message selector, and notifies the web browser that the notification channel has been created. The web notification management platform 110 is configured to leverage the topic subscription to deliver web notifications in the long poll state using the message selector to rout the web notification to the right notification channel.

In response to having receiving the notification that the notification channel has been created, the web browser opens a websocket connection and transmits a request to the web notification management platform 110 to accept the websocket connection. Accordingly, the web notification management platform 110 can accept the websocket connection, if supported, or notify the web browser that the websocket connection was not accepted. The web notification management platform 110 is configured to leverage the websocket connection in a similar fashion to the topic subscription as described previously, but for delivery of the web notification via the websocket connection.

If the websocket connection was accepted the web browser waits until a notification has been received; otherwise, the web browser transmits a notification request to the web notification management platform 110 according to a long poll topic subscription. Accordingly, the web notification management platform 110 can manage the transmission of web notifications using either the websocket connection or the long poll subscription, whichever may be required under the conditions encountered during creation of the notification channel.

It should be appreciated that, by supporting both the long poll subscription and the websocket connection, the web notification management platform 110 can support browser versatility. In other words, the websocket connection, if supported/accepted, can be effectively handled in browsers/server middle layer, while the long poll can be used a fallback working in any combination of browser, proxy, router, etc., where hypertext transfer protocol (HTTP) is supported.

Accordingly, by using such message oriented middleware, web notifications can be delivered from a cloud application to a user session without the cloud application needing to perform various computationally intensive and/or time-sensitive operations, such as opening/managing partially opened sessions, handle event multiplication by an amount of open user sessions, and manage appropriate session selection for each message. In other words, the web notification management platform 110 provides a highly scalable solution which demonstrates low per notification and per browser session overhead by organizing the flow of web notifications (e.g., associated with events) from cloud applications to end users, thereby substantially removing from the cloud application complexities associated with present solutions, such as session negotiation, redelivery, and multiplexing, to name a few.

The illustrative end user computing device 102 includes a web browser 104. The web browser 104 may be embodied as any type of software application, web-browser, or other thin/zero client application residing on the end user computing device 102 which is capable of performing the functions described herein, such as opening the notification channel, reading stored notifications, actively monitoring changes through long poll or websocket, or otherwise access information provided by web servers, files, or other information sources. The illustrative cloud service broker computing device 108, as noted previously, includes the web notification management platform 110, which will be described in further detail below. The illustrative application host computing device 112, as also noted previously, includes one or more application integrations 114. The application integrations 114 may be embodied as one or more web-based services/applications, connectors, cloud-based services/applications, etc.

As shown in the illustrative client-server system 100, each of the end user computing device 102, the cloud service broker computing device 108, and the application host computing device 112 are embodied as computing devices 116. Accordingly, it should be appreciated that each of the respective computing devices 116 may be embodied as any type of compute and/or storage device capable of performing the functions described herein. For example, in some embodiments, the end user computing device 102 may be embodied as a desktop computer or a mobile computing device (e.g., a smartphone, a wearable, a tablet, a laptop, a notebook, etc.), while the cloud service broker computing device 102 and/or the application host computing device 112 may be embodied as one or more servers (e.g., stand-alone, rack-mounted, etc.), compute devices, storage devices, and/or or combination of compute blades and data storage devices (e.g., of a storage area network (SAN)) in a cloud architected network or data center.

It should be appreciated further that, while each of the end user computing device 102, the cloud service broker computing device 108, and application host computing device are illustratively shown as single computing devices 116, one or more of the application vendor computing devices 102 may be embodied as more than one computing device 116, in other embodiments. Accordingly, in some embodiments, one or more functions of the cloud service broker computing device 108 as described herein, for example, may be executed on one or more computing devices 116, while one or more same, additional, or alternative functions of the cloud service broker computing device 108 as described herein may be executed on one or more other computing devices 116.

Figure 2:
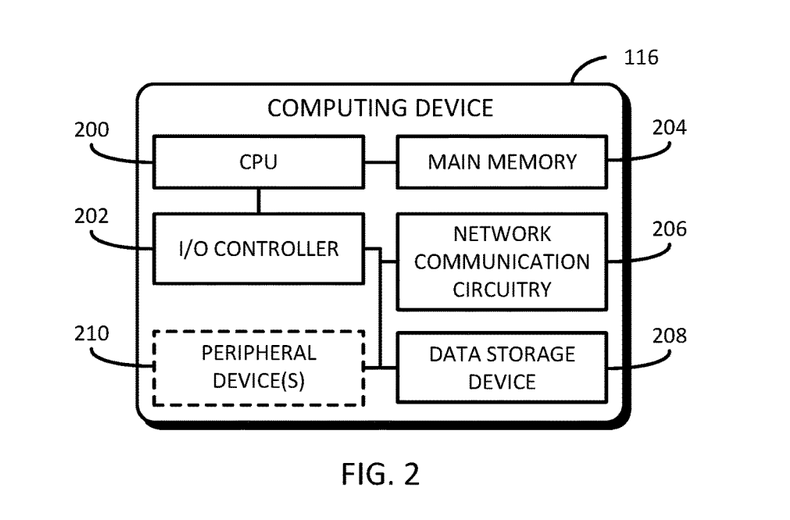
FIG. 2 is a block diagram of an illustrative embodiment of one of the computing devices of the client-server system of FIG. 1.

Referring now to FIG. 2, an illustrative computing device 116 (e.g., an illustrative one of the end user computing device 102, the cloud service broker computing device 108, and the application host computing device 112) includes a central processing unit (CPU) 200, an input/output (I/O) controller 202, a main memory 204, network communication circuitry 206, a data storage device 208, and, in some embodiments, one or more I/O peripherals 210. In some alternative embodiments, the computing device 116 may include additional, fewer, and/or alternative components to those of the illustrative computing device 116, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 116 may be predicated upon the type and intended use of the respective computing device 116. For example, the cloud service broker computing device 108 may not include any peripheral devices 210; whereas the end user computing device 102 may include multiple peripheral devices 210. Additionally, as described previously, the cloud service broker computing device 108 may be comprised of more than one computing device 116. Accordingly, in such embodiments, it should be further appreciated that one or more of the computing devices 116 of the cloud service broker computing device 108 may be configured as a database server with less compute capacity and more storage capacity relative to another of the computing devices 116 of the cloud service broker computing device 108. Similarly, one or more other computing devices 116 of the cloud service broker computing device 108 may be configured as an application server with more compute capacity relative and less storage capacity relative to another of the computing devices 116 of the cloud service broker computing device 108.

The CPU 200, or processor, may be embodied as any combination of hardware and circuitry capable of processing data. In some embodiments, the computing device 116 may include more than one CPU 200. Depending on the embodiment, the CPU 200 may include one processing core (not shown), such as in a single-core processor architecture, or multiple processing cores (not shown), such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 116. Illustratively, the I/O controller 202 is configured to receive input/output requests from the CPU 200, and send control signals to the respective input/output devices, thereby managing the data flow to/from the computing device 116.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 116 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 116 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

The I/O peripherals 210 may be embodied as any type of auxiliary device configured to connect to and communicate with the computing device 116. Depending on the embodiment, the one or more I/O peripherals 210 may include a display, a microphone, a speaker, a mouse, a keyboard, a touchscreen, a camera, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 116 via a cable (e.g., a ribbon cable, a wire, a universal serial bus (USB) cable, a high-definition multimedia interface (HDMI) cable, etc.) connected to a corresponding port (not shown) of the computing device 116 through which the communications made therebetween can be managed by the I/O controller 202. In alternative embodiments, the I/O peripherals 210 may be connected to the computing device 116 via a wireless mode of communication (e.g., Bluetooth®, Wi-Fi®, etc.) which may be managed by the network communication circuitry 206.

Referring back to FIG. 1, as noted previously, the end user computing device 102 and the application host computing device 112 are each communicatively coupled to the cloud service broker computing device 108 via the network 106. The network 106 may be implemented as any type of wired and/or wireless network, including a local area network (LAN), a wide area network (WAN), a metropolitan area network (MAN), a global network (the Internet), etc., utilizing any wired and/or wireless communication technologies and network communication transmission protocols. Accordingly, the network 106 may include one or more communicatively coupled network computing devices (not shown) for facilitating the flow and/or processing of network communication traffic via a series of wired and/or wireless interconnects.

Such network computing devices may include, but are not limited, to one or more access points, routers, switches, servers, compute devices, storage devices, etc. It should be appreciated that one or more of the network computing devices and/or network configurations may be virtualized (e.g., a virtual switch, a virtual LAN, etc.). It should be further appreciated that the end user computing device 102, the cloud service broker computing device 108, and the application host computing device 112 may use different networks (e.g., LANs, provider networks, etc.) to connect to the backbone of the network 106 such that a number of communication channels can be established therein to enable communications therebetween.

Figure 3:
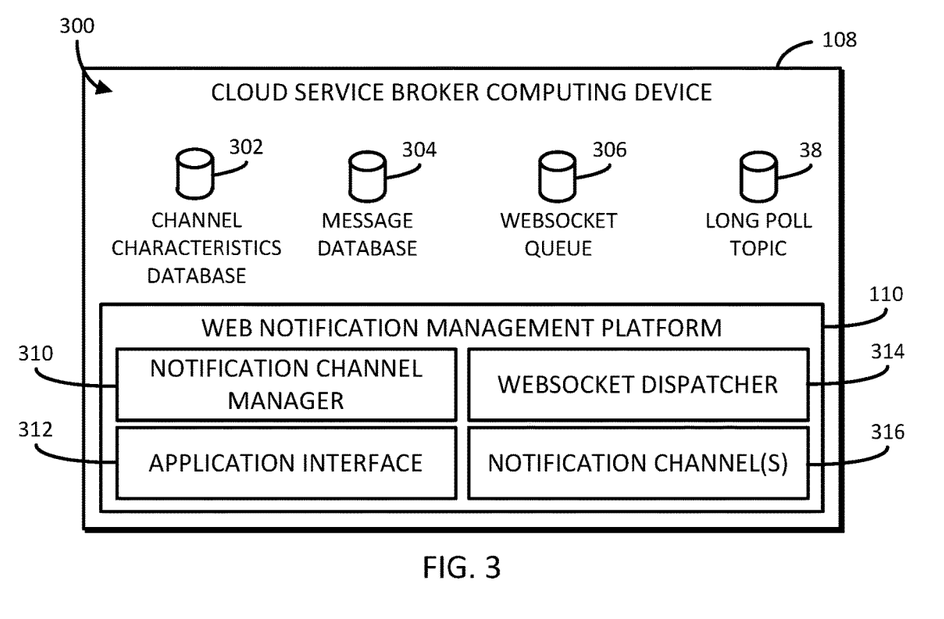
FIG. 3 is a block diagram of an illustrative environment of the service broker computing device of the client-server system of FIG. 1.

Referring now to FIG. 3, an illustrative environment 300 of the cloud service broker computing device 108 is shown. The illustrative environment 300 includes a channel characteristics database 302, a message database 304, a websocket queue 306, and long poll topic 308. In some embodiments, access to the data provided to and/or generated as described herein may require authorization and/or that such data is encrypted while in storage and/or transit. Accordingly, in some embodiments, one or more authentication and/or encryption technologies known to those of skill in the art may be employed to ensure the storage and access to the data complies with any legal and/or contractual requirements.

It should be further appreciated that, in some embodiments, the data stored in the respective databases may not be mutually exclusive. In other words, certain data described herein as being stored in one database may additionally or alternatively be stored in another database described herein, or another database altogether. It should be further appreciated that, in some embodiments, the data may be stored in a single database, or an alternative database/data storage arrangement. Additionally, the illustrative databases described herein may be combined or further segregated, in other embodiments.

The illustrative environment 300 additionally includes the web notification management platform 110 of FIG. 1, which may be embodied as any type of firmware, hardware, software, circuitry, or combination thereof capable of performing the functions described herein. The illustrative web notification management platform 110 includes a notification channel manager 310, an application interface 312, a websocket dispatcher 314, and one or more notification channels 316. Each of the notification channel manager 310, the application interface 312, the websocket dispatcher 314, and the one or more notification channels 316 may be embodied as any type of firmware, hardware, software, circuitry, or combination thereof.

One or more of the notification channel manager 310, the application interface 312, the websocket dispatcher 314, and the one or more notification channels 316 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein. It should be appreciated that the environment 300 may additionally include one or more structures usable to store at least a portion of the data elements described herein (e.g., a database) such that the data can be accessed, managed, and updated as appropriate. However, such structures are not shown herein to preserve clarity of the description.

The notification channel manager 310 is configured to manage the notification channels (e.g., the notification channels 316). To do so, the notification channel manager 310 is configured to authenticate incoming session requests, open long poll topic subscriptions with a corresponding message selector, and route incoming HTTP requests to the appropriate one of the notification channels 316. The message selector may be based on a dimensional channel hierarchy determined as a function of the user for which the notification channel is being created. It should be appreciated that the message selector may be a single-dimensional selector (e.g., a staff member) or a multi-dimensional selector (e.g., a service user). For example, a single-dimensional selector may include an account identifier, while a 2-dimensional selector may include an account identifier and a user identifier pair, though it should be appreciated that the dimension of the message selector may be extended beyond the two dimensions.

The notification channel manager 310 is additionally configured to manage characteristics of the notification channel (i.e., notification channel characteristics). In some embodiments, the notification channel characteristics may be stored in the channel characteristics database 302. The notification channel characteristics may include any information useful to identify an aspect of the notification channel or an association therewith, such as an identifier of the notification channel, an associated message selector, a present notification channel state (i.e., "new," "long poll," and "websocket"), a topic subscription, and a websocket connection. It should be appreciated that some of the notification channel characteristics may be used for different purposes.

For example, the notification channel identifier may be transmitted to a web browser (e.g., the web browser 104 of FIG. 1) for use in messages received from the web browser, while the other notification channel characteristics rest may be used exclusively by the web notification management platform 110, in some embodiments. It should be appreciated that the notification channel identifier may be strictly bound to a message selector in a particular moment of time because the notification channel identifier and the message selector are typically strictly bound to a user or a staff-member's credentials. In other words, it is not impossible to have multiple notification channels with different notification channel identifiers but identical message selectors.

The application interface 312 is configured to receive operation state change events from the application integrations 114 and transmit the web notifications (e.g., operation state change notifications) associated with the received operation state change events which are received from the application integrations 114. For example, operation state change events may be triggered by any operations/functions that a cloud service broker may encounter when interfacing with one of the application integrations 114 of FIG. 1, such as creating a new customer, buying a subscription for a customer, creating/assigning services, creating service users, changing subscriptions plans/limits, disabling/terminating subscriptions, processing payments, provisioning applications, etc.

In furtherance of the example, the application interface 312 may receive an operation state change event corresponding to a "process order" operation. Accordingly, under such conditions, the application interface 312 is configured to transmit any web notifications received in association with the process order operation, such as "order scheduled," "payment received," "provisioning completed," etc., as well as any error states associated with the process order operation, such as "fraud protection failure," "payment error," etc., such that a user can identify a status of the operation state change event (e.g., via the web browser 104 of their end user computing device 102).

The application interface 312 is additionally configured to store the received operation state change events from the application integrations 114 in a database (e.g., the message database 304) for intended recipients which are presently logged off, such that the messages can be transmitted to the intended recipient when the intended recipient is logged in. Additionally, the application interface 312 is configured to push the messages to the websocket queue 306 for websocket notification sessions (e.g., if the notification channel state is set to "websocket") and to the long poll topic 308 for long poll notification sessions (e.g., if the notification channel state is set to "long poll").

The websocket dispatcher 314 is configured to manage the web notifications placed in the websocket queue. To do so, the websocket dispatcher 314 is configured to push the web notifications placed in the websocket queue to the appropriate channel. Additionally, the websocket dispatcher 314 is configured to ensure no notifications read from persistent storage will go unsent. To do so, the websocket dispatcher 314 is configured to requeue any web notifications if the channel associated with the web notifications for the intended account or user is in a "new" state. It should be appreciated that all opened websockets are stored such that a lookup may be performed thereon (e.g., by user and/or account) and that all web notifications in the websocket queue 306 are written in all opened websockets of the originating user and/or account.

Each of the notification channels 316 is configured to represent server-side opened notification sessions. The notification channels 316 can be in one of three states: "new," "long poll," or "websocket." Each notification channel 316 is configured to maintain a subscription to a long poll topic in case the channel is in the "new" or "long poll" state. Accordingly, the subscription to the long poll topic can ensure that all of the in-flight notifications will sent. It should be appreciated that all of the web notifications pushed to the long poll topic subscription have an associated message selector based on which entity triggered the operation associated with the web notification. Accordingly, if a user with a 2-dimensional message selector triggers the operation associated with the web notification, the web notification will be sent in that user's browser sessions and in any browser session associated with the appropriate staff member who has single-dimensional message selector based on the same account as the user's 2-dimensional message selector. Additionally, each notification channel 316 is configured to automatically close (e.g., upon timeout, request, etc.) if a web browser initiates a user session but does not return for notifications or too much time has passed since the last long poll request for notifications was received.

In an illustrative example in which the web notification management platform 110 is expressed in Java Platform, Enterprise Edition, the application interface 312 can be abstracted as a stateless session bean in which an application server manages a pool size (i.e., the amount of simultaneous processed requests). Additionally, the application interface 312 can be abstracted as a singleton enterprise bean in which the application server takes care of concurrency management. Further, the websocket dispatcher 314 can be abstracted as a message driven enterprise bean which is activated by messages in a websocket messaging queue. Further still, the notification channels 316 can be abstracted as a state full enterprise bean with timeout in which the application server tracks a not-used time interval and properly closes the channel as applicable.

Figure 4:
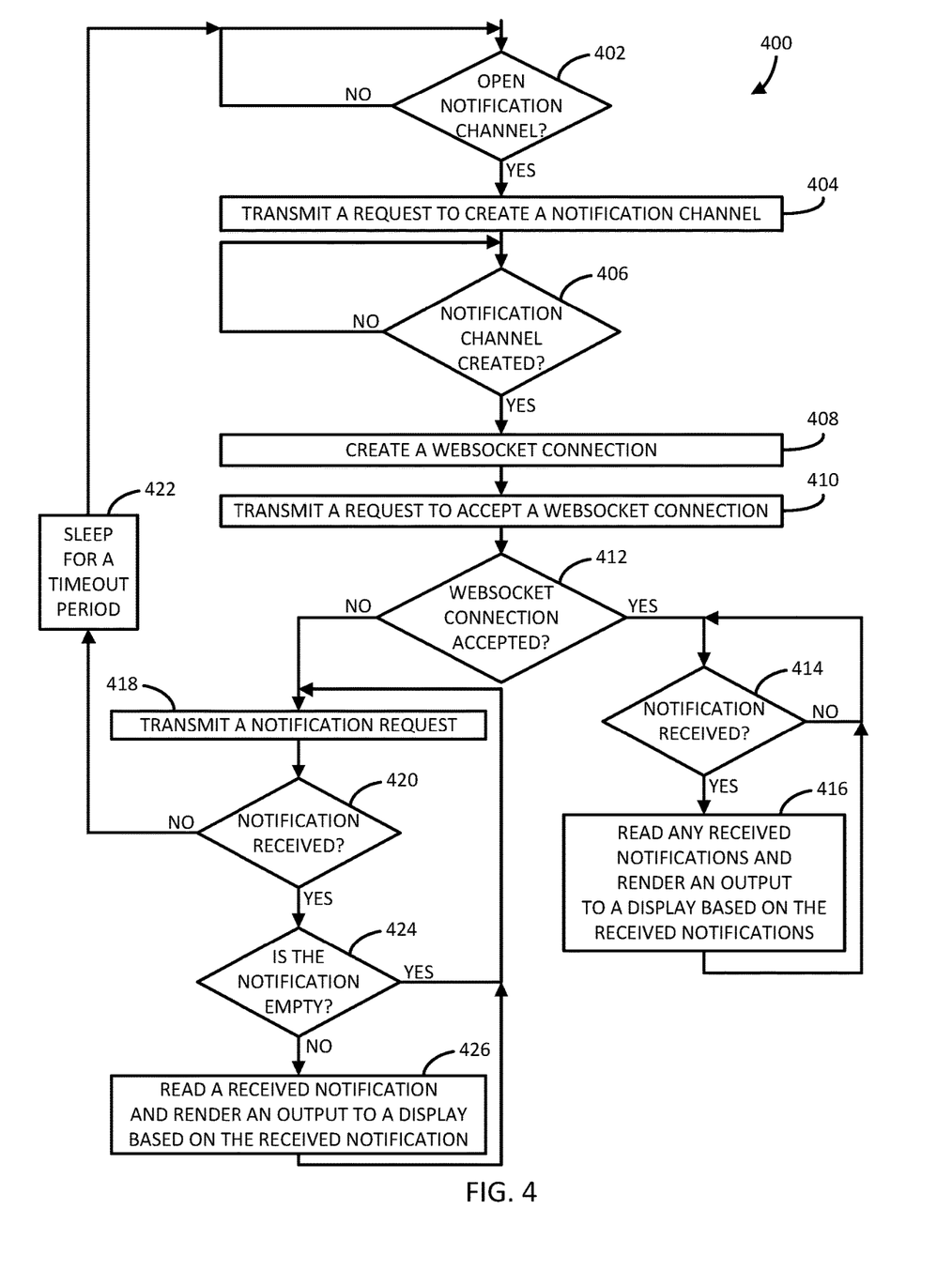
FIG. 4 is a schematic flow diagram of an illustrative method for setting up a notification channel that may be performed by the end user computing device of the client-server system of FIG. 1.

Referring now to FIG. 4, an illustrative method 400 is provided for setting up a notification channel that may be performed by an end user computing device (e.g., the end user computing device 102 of FIG. 1), or more particularly by a web browser (e.g., the web browser 104) of the end user computing device. The method 400 begins in block 402, in which the web browser 104 determines whether to open a notification channel with a cloud service broker computing device (e.g., the cloud service broker computing device 108 of FIG. 1), or more particularly with a web notification management platform (e.g., the web notification management platform 110 of FIG. 1) of the cloud service broker computing device, such that the notification channel may be used to receive web notifications (e.g., operation state change notifications) from an application integration (e.g., one of the application integrations 114 of the application host computing device 112 of FIG. 1).

If the web browser 104 determines to open the notification channel with the web notification management platform 110, the method 400 advances to block 404, in which the web browser 104 transmits a request to the web notification management platform 110 to create a notification channel. In block 406, the web browser 104 determines whether the notification channel has been created, such as may be indicated by an affirmative response from the web notification management platform 110. If the notification channel has been created, the method 400 advances to block 408, in which the web browser 104 creates a websocket connection. In block 410, the web browser 104 transmits a request to the web notification management platform 110 to accept the websocket connection. It should be appreciated that, in some embodiments, the request may include any information about the websocket connection necessary for the web notification management platform 110 to determine whether to accept the websocket connection.

In block 412, the web browser 104 determines whether the websocket connection was accepted (i.e., by the web notification management platform 110). If not, the method 400 branches to block 418, which is described below; otherwise, if the web browser 104 determines the websocket connection was accepted, the method 400 branches to block 414. In block 414, the web browser 104 determines whether a web notification has been received. If so, the method 400 proceeds to block 416, in which the web browser 104 reads any received notifications and renders an output to a display of the end user computing device 102 based on the received notifications. In other words, the web browser 104 displays text and/or graphics associated with the notification indicating a present status of an operation being performed by an application integration for which the user of the web browser 104 is associated (e.g., based on the message selector).

Referring back to block 412, as described previously, if the web browser 104 determines the websocket connection was not accepted (e.g., the web notification management platform 110 does not support the websocket connection, some error occurred prior to the web notification management platform 110 being able to accept the websocket connection, etc.), the method branches to block 418. In block 418, the web browser 104 transmits a notification request (e.g., a long poll request) to the web notification management platform 110. In block 420, the web browser 104 determines whether a notification has been received in response to the notification request. It should be appreciated that, in some embodiments, a timeout duration may be associated with the notification request such that the web browser 104 may determine a notification has not been received upon a timer equaling the timeout duration.

If the notification has not been received, the method 400 branches to block 422 in which the web browser 104 sleeps for a timeout period before returning to block 402. Otherwise, if the notification has been received, the web browser 104 determines whether the notification is empty. If the web browser 104 determines the notification is empty, the method 400 returns to block 418 to transmit another notification request; otherwise, the method 400 advances to block 426. In block 426, the web browser 104 reads any received notifications and renders an output to a display of the end user computing device 102 based on the received notification before the method 400 returns to block 418 to transmit another notification request. In other words, similar to the process described in block 416, the web browser 104 displays text and/or graphics based on the contents of the notification which are usable to identify a present status of an operation being performed by an application integration for which the user of the web browser 104 is associated (e.g., based on the message selector).

Figure 5A:
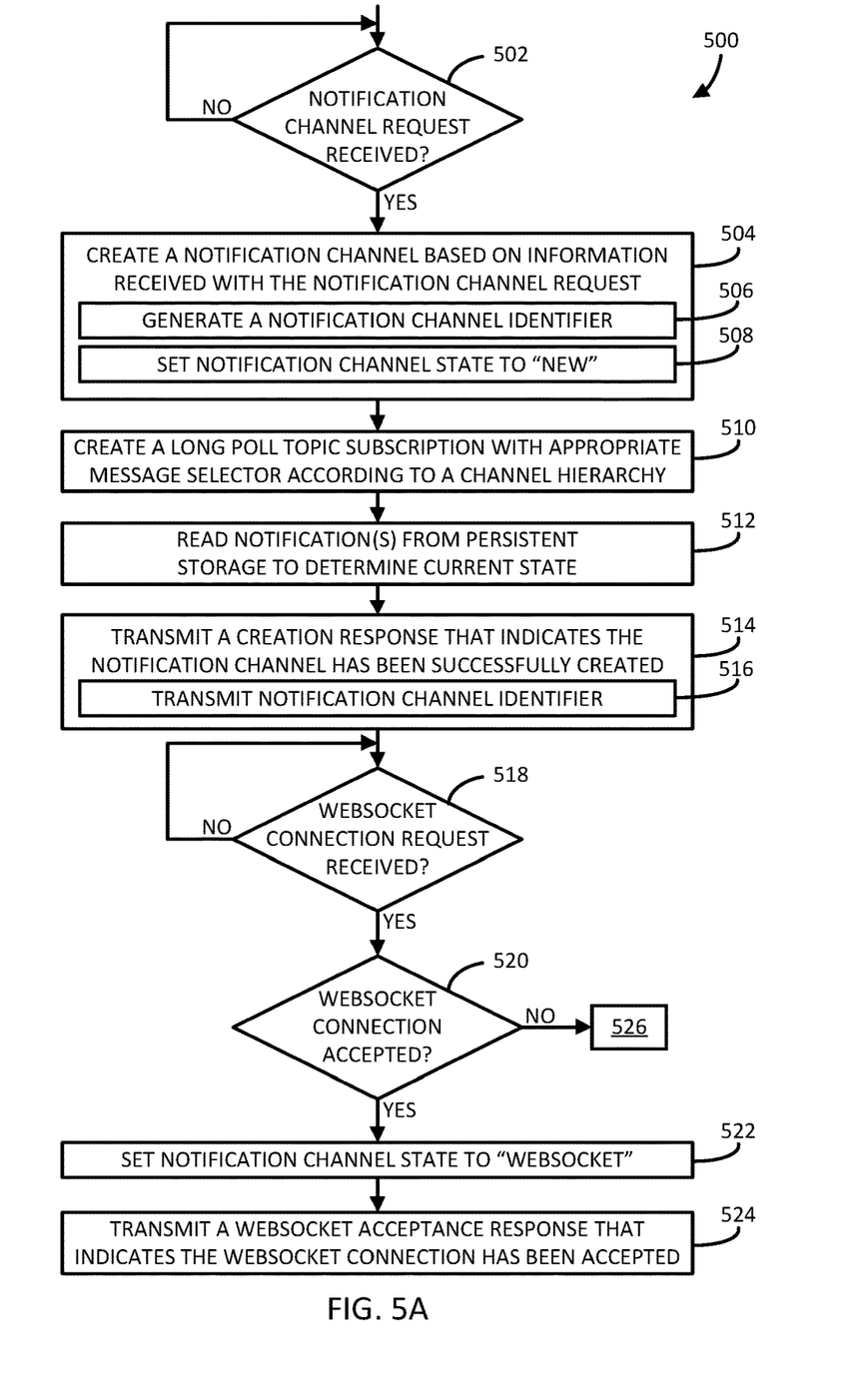
FIGS. 5A and 5B are a schematic flow diagram of an illustrative method for creating a notification channel that may be performed by the cloud service broker computing device of FIGS. 1 and 3.
Figure 5B:
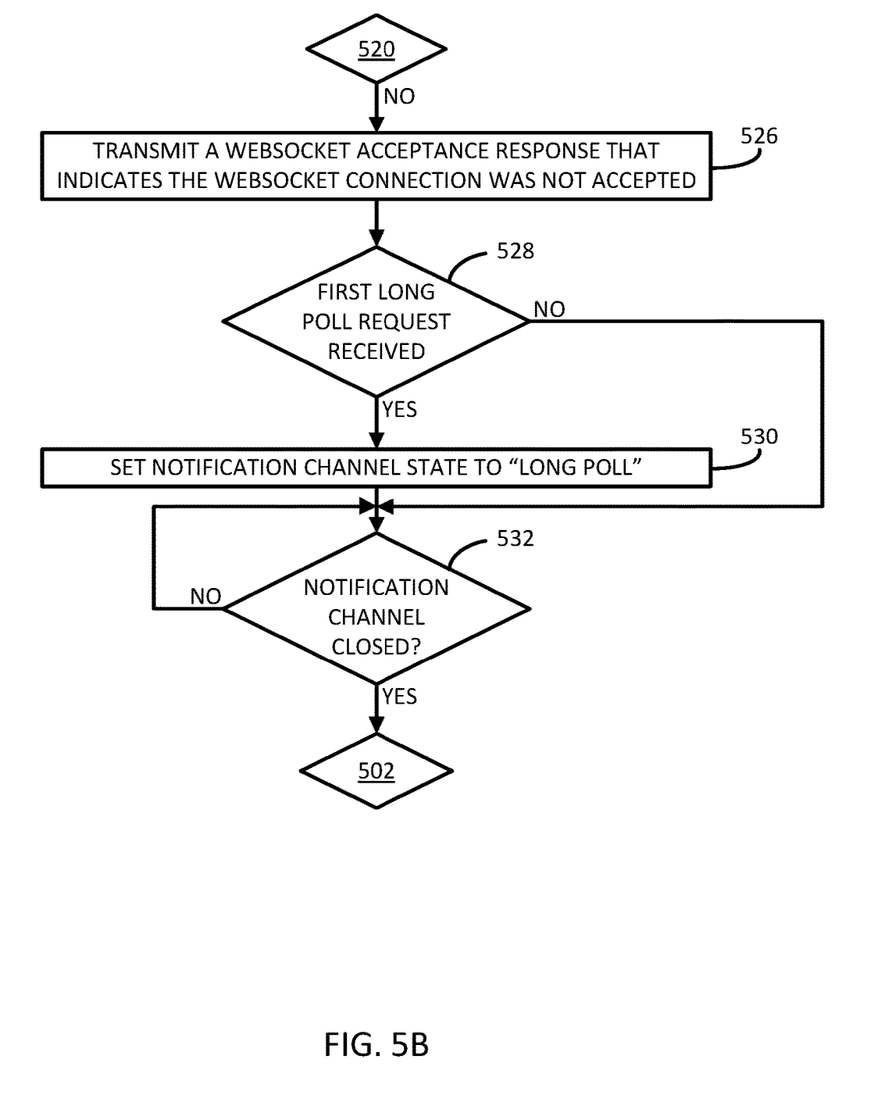

Referring now to FIGS. 5A and 5B, an illustrative method 500 is provided for creating a notification channel that may be performed by a cloud service broker computing device (e.g., the cloud service broker computing device 108 of FIG. 1), or more particularly by a web notification management platform (e.g., the web notification management platform 110 of FIG. 1) of the cloud service broker computing device. The method 500 begins in block 502, in which the web notification management platform 110 determines whether a notification channel request has been received from a web browser (e.g., the web browser 104 of FIG. 1).

If the notification channel request has been received, the method 500 advances to block 504, in which the web notification management platform 110 creates a notification channel (e.g., one of the notification channels 316 of the illustrative web notification management platform 110 of FIG. 3) based on information received with the notification channel request. Additionally, in block 506, the web notification management platform 110 generates a unique identifier usable to identify the notification channel (i.e., a notification channel request). In block 508, the web notification management platform 110 additionally sets a state associated with the notification channel (i.e., a notification channel state) to "new."

In block 510, the web notification management platform 110 creates a long poll topic subscription with a message selector according to a channel hierarchy. As described previously, the message selector may be based on a single- or multi-dimensional channel hierarchy as can be determined as a function of the user or a staff-member for which the notification channel is being created. In block 512, the web notification management platform 110 reads any notifications from persistent storage to determine a state of the operation for which the web notification management platform 110 will send the further notifications. The current state can be received from the last notification about the last operation state change. In block 514, the web notification management platform 110 transmits a notification channel creation response to the web browser 104 that indicates the notification channel has been successfully created. Additionally, in block 516, the web notification management platform 110 transmits the response with the notification channel identifier generated in block 506.

In block 518, the web notification management platform 110 determines whether a websocket connection request has been received. If so, the method 500 advances to block 520, in which the web notification management platform 110 determines whether the websocket connection was accepted (e.g., whether the web notification management platform 110 supports the websocket connection, whether an error occurred during or prior to acceptance of the websocket connection, etc.). If the websocket connection was not accepted, the method 500 branches to block 526 (shown in FIG. 5B), which is described below; otherwise, the method 500 branches to block 522. In block 522, the web notification management platform 110 sets the notification channel state to "websocket." In block 524, the web notification management platform 110 transmits a response to the web browser 104 indicating that the websocket connection has been accepted.

As described previously, if the web notification management platform 110 does not accept the websocket connection in block 520, the method 500 branches to block 526. In block 526, the web notification management platform 110 transmits a response that indicates the websocket connection was not accepted. In block 528, the web notification management platform 110 determines whether a first long poll request has been received from the web browser 104. If not, the method 500 branches to block 532 to wait for the channel to be closed; otherwise, the method 500 branches to block 530. In block 530, the web notification management platform 110 sets the notification channel state to "long poll" before the method 500 advances to block 532 in which the web notification management platform 110 wait for the notification channel to be closed. If the web notification management platform 110 determines the notification channel has closed, the method 500 returns to block 502 to determine whether another notification channel request has been received.

Figure 6:
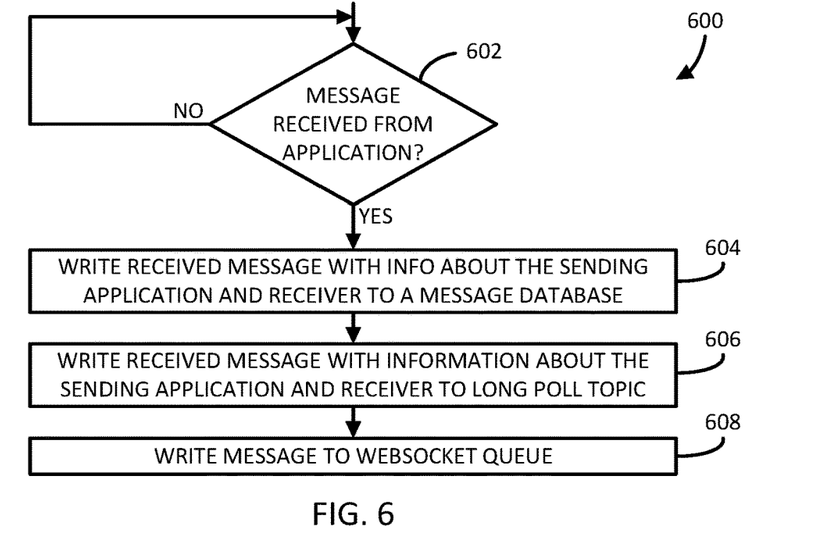
FIG. 6 is a schematic flow diagram of an illustrative method for managing web notifications received from a cloud application integration that may be performed by the cloud service broker computing device of FIGS. 1 and 3.

Referring now to FIG. 6, an illustrative method 600 is provided for managing web notifications received from a cloud application integration (e.g., one of the application integrations 114 of FIG. 1) that may be performed by a cloud service broker computing device (e.g., the cloud service broker computing device 108 of FIG. 1), or more particularly by a web notification management platform (e.g., the web notification management platform 110 of FIG. 1) of the cloud service broker computing device. It should be appreciated that a websocket connection has already been established by a web browser (e.g., the web browser 104 of FIG. 1) and accepted by the web notification management platform 110 prior to the method 600 being initiated.

The method 600 begins in block 602, in which the web notification management platform 110 determines whether a message (e.g., a web notification associated with an operation state change event) has been received from the application integration 114. If so, the method 600 advances to block 604, in which the web notification management platform 110 writes the received message with information about the sending application and the intended recipient to a message database (e.g., the message database 304 of FIG. 3). In block 606, the web notification management platform 110 writes the received message with information about the sending application and the intended recipient to a long poll topic (e.g., the long poll topic 308 of FIG. 3) associated with the notification channel previously established between the web browser 104 and the web notification management platform 110. In block 608, the web notification management platform 110 writes the message to a websocket queue (e.g., the websocket queue 306 of FIG. 3).

It should be appreciated that the received message written to the long poll topic additionally includes a corresponding message selector such that the appropriate long poll topic subscription can be associated with the received message written to the long poll topic. It should be additionally appreciated that the received message written to the websocket queue is stored such that it can be identified by a user and account lookup and all messages in the websocket queue are written in all opened websockets associated with the originating user and account.

Figure 7:
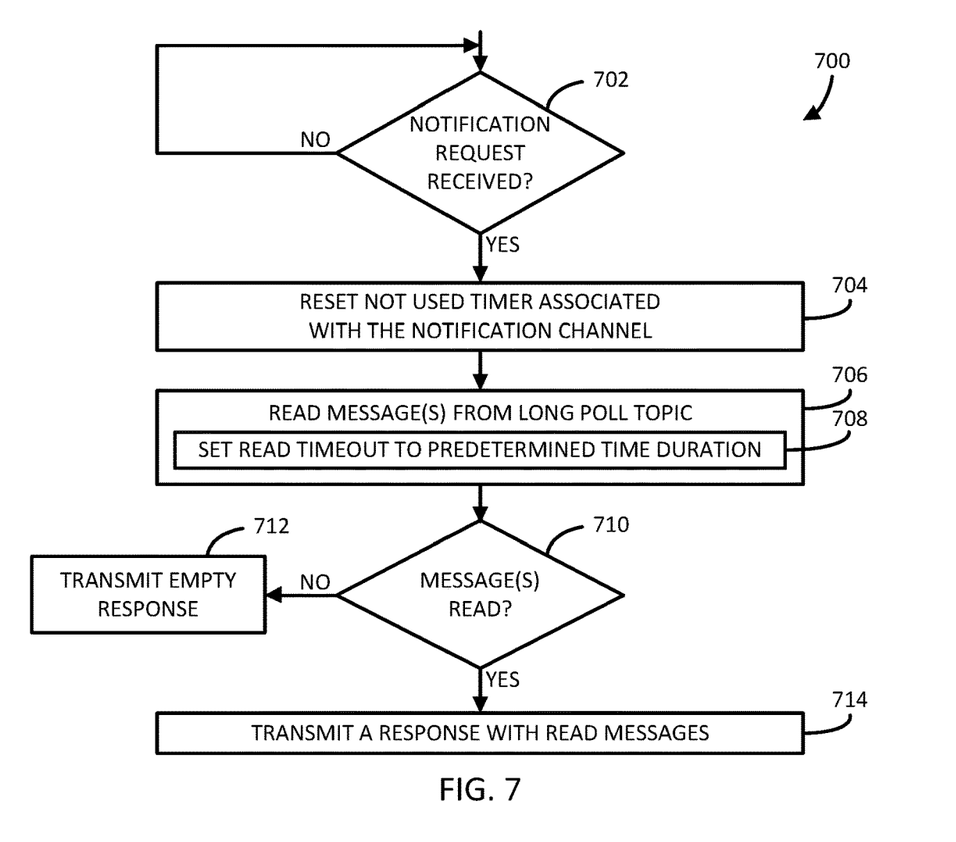
FIG. 7 is a schematic flow diagram of an illustrative method for managing web notification delivery through long poll that may be performed by the cloud service broker computing device of FIGS. 1 and 3.

Referring now to FIG. 7, an illustrative method 700 is provided for managing web notification delivery through long poll that may be performed by a cloud service broker computing device (e.g., the cloud service broker computing device 108 of FIG. 1), or more particularly by a web notification management platform (e.g., the web notification management platform 110 of FIG. 1) of the cloud service broker computing device. It should be appreciated that a notification channel has already been established between a web browser (e.g., the web browser 104 of FIG. 1) and the web notification management platform 110 prior to the method 700 being initiated.

The method 700 begins in block 702, in which the web notification management platform 110 determines whether a notification request has been received from the web browser 104. If so, the method 700 advances to block 704, in which the web notification management platform 110 resents a not used timer associated with the notification channel. In block 706, the web notification management platform 110 reads one or more messages from the long poll topic (e.g., the long poll topic 308 of FIG. 3). Additionally, in block 708, the web notification management platform 110 sets a read timeout to a predetermined timeout duration.

In block 710, the web notification management platform 110 determines whether any messages have been read from the long poll topic before the read timeout duration has been reached. If not, the method 700 branches to block 710 in which the web notification management platform 110 transmits an empty response before returning to block 702 to determine whether another notification request has been received. Otherwise, if the web notification management platform 110 determines that one or more messages have been read from the long poll topic, the method 700 advances to block 714. In block 714, the web notification management platform 110 transmits a response to the web browser 104 that includes the read messages from the long poll topic before the method 700 returns to block 702 to determine whether another notification request has been received.

Figure 8:
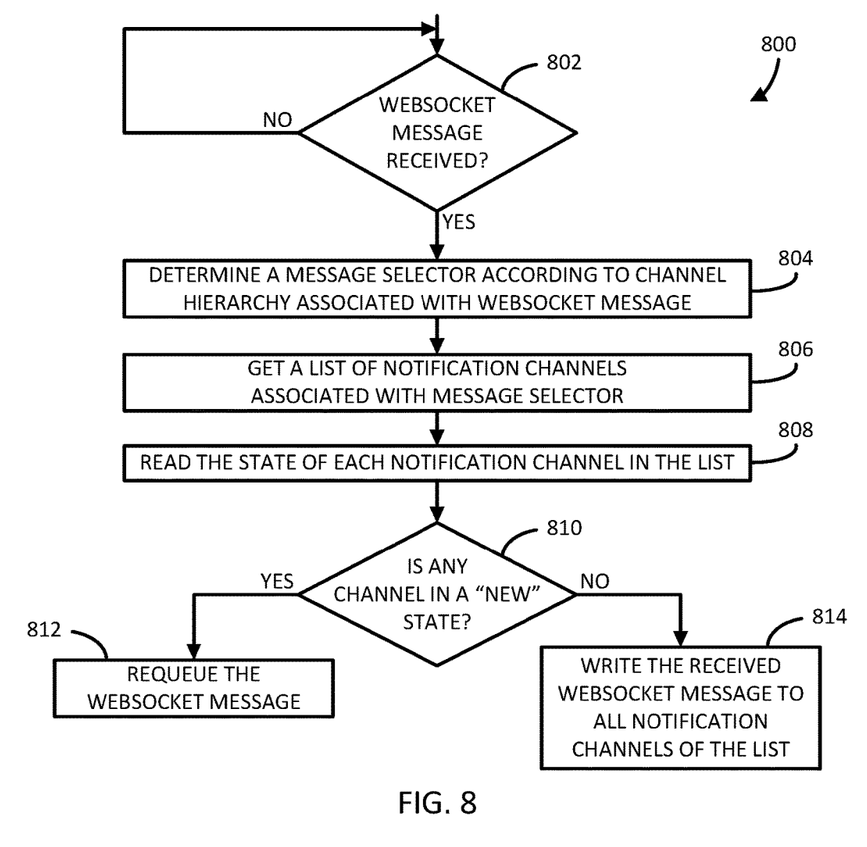
FIG. 8 is a schematic flow diagram of an illustrative method for managing web notification delivery through a websocket connection that may be performed by the cloud service broker computing device of FIGS. 1 and 3.

Referring now to FIG. 8, an illustrative method 800 is provided for managing web notification delivery through a websocket connection that may be performed by a cloud service broker computing device (e.g., the cloud service broker computing device 108 of FIG. 1), or more particularly by a web notification management platform (e.g., the web notification management platform 110 of FIG. 1) of the cloud service broker computing device. It should be appreciated that a notification channel has already been established between a web browser (e.g., the web browser 104 of FIG. 1) and the web notification management platform 110, and that a web socket connection has been established by the web browser 104 and accepted by the web notification management platform 110 by prior to the method 800 being initiated.

The method 800 begins in block 802, in which the web notification management platform 110 determines whether a websocket message has been received (e.g., by the websocket dispatcher 314 of FIG. 3) from an application integration and stored in a websocket queue (e.g., the websocket queue 306 of FIG. 3). If so, the method 800 advances to block 804, in which the web notification management platform 110 determines a message selector according to the channel hierarchy associated with the websocket message. As described previously, the message selector may be based on a single- or multi-dimensional channel hierarchy as can be determined as a function of the user for which the notification channel is being created. In block 806, the web notification management platform 110 gets a list of channels associated with the message selector, such as may be stored in a channel characteristics database (e.g., the channel characteristics database 302 of FIG. 3).

In block 808, the web notification management platform 110 reads the channel notification state of each notification channel in the list. In block 810, the web notification management platform 110 determines whether any of the notification channel states of the notification channels of the list are in the "new" state. If so, the method 800 branches to block 812 in which the web notification management platform 110 requeues the websocket message; otherwise, the method 800 branches to block 814, in which the web notification management platform 110 writes the message to all associated notification channels of the list.

While the present disclosure of the client-server system 100 has been illustratively shown in the context of a cloud service brokerage system, it should be appreciated that the message oriented middleware (i.e., the web notification management platform 110) as described herein may be used in any system in which many $3^{rd}$ party applications/services are used and web notifications are to be sent to a hierarchy of users about operation state change events of the $3^{rd}$ party applications/services. Additionally, while the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for managing web notifications between a web browser and an application integration in a client-server system, the method comprising:

creating, by a web notification management platform, a notification channel at the web notification management platform in response to having received a notification channel request from the web browser of an end user computing device;

setting, by the web notification management platform, a notification channel state of the notification channel to indicate the notification channel state is in a new state;

identifying, by the web notification management platform, a message selector to be associated with the notification channel, wherein the message selector is based on a dimensional channel hierarchy determined as a function of a user for which the notification channel is being created, and wherein the message selector is usable to route web notifications to the notification channel;

creating, by the web notification management platform, a long poll topic subscription as a function of the message selector;

receiving, by the web notification management platform, a websocket connection request from the web browser;

transmitting, by the web notification management platform, an indication of whether the websocket connection request has been accepted
receiving, by the web notification management platform, a notification request from the web browser;
determining, by the web notification management platform and as a function of the message selector, whether the long poll topic includes one or more messages received from the application integration;
reading, by the web notification management platform and in response to a determination that the long poll topic includes the one or more messages, the one or more messages from the long poll topic; and
transmitting, by the web notification management platform, a response to the web browser that includes the one or more messages.

2. The method of claim 1, further comprising:
setting, by the web notification management platform and in response to a determination that the websocket connection request has been accepted, the notification channel state to indicate the notification channel state is in a websocket state; and
transmitting, by the web notification management platform, to the web browser, a websocket acceptance response that indicates the websocket connection request has been accepted.

3. The method of claim 1, further comprising transmitting, by the web notification management platform, a notification channel creation response indicating the notification channel has been successfully created.

4. The method of claim 3, wherein creating the notification channel includes generating a notification channel identifier usable to identify the notification channel and wherein transmitting the notification channel creation response includes transmitting the notification channel identifier.

5. The method of claim 1, further comprising:
transmitting, by the web notification management platform, to the web browser, a websocket acceptance response that indicates the websocket connection request has not been accepted;
receiving, by the web notification management platform, a long poll request; and
setting, by the web notification management platform and in response to a determination that the websocket connection request has not been accepted, the notification channel state to indicate the notification channel state is in a long poll state.

6. The method of claim 1, further comprising:
receiving, by the web notification management platform, a message from the application integration;
writing, by the web notification management platform, the received message to a message database of the web notification management platform;
writing, by the web notification management platform, the received message to a long poll topic; and
writing, by the web notification management platform, the received message to a websocket queue.

7. The method of claim 6, wherein the message comprises a web notification indicating an operation state change event performed by the application integration.

8. The method of claim 1, further comprising transmitting, by the web notification management platform and in response to a determination that the long poll topic does not include the one or more messages, a response to the web browser that is empty.

9. The method of claim 1, further comprising:
receiving, by the web notification management platform, a websocket message from the application integration;
queueing, by the web notification management platform, the websocket message in a websocket queue;
retrieving, by the web notification management platform, the websocket message from the websocket queue;
retrieving, by the web notification management platform, a list of notification channels associated with a message selector of the websocket message;
determining, by the web notification management platform, whether a notification channel state of at least one notification channel of the list of notification channels is in a new state; and
writing, by the web notification management platform and in response to having determined that not one notification channel of the list of notification channels is in the new state, the received websocket message to the each notification channel of the list of notification channels.

10. The method of claim 9, further comprising requeueing, by the web notification management platform and in response to having determined that at least one notification channel of the list of notification channels is in the new state, the received websocket message to the websocket queue.

11. A web notification management platform for managing web notifications between a web browser and an application integration in a client-server system, the web notification management platform comprising:
one or more computer-readable medium comprising instructions; and
one or more processors coupled with the one or more computer-readable medium and configured to execute the instructions to:
create a notification channel at the web notification management platform in response to having received a notification channel request from the web browser of an end user computing device;
set a notification channel state of the notification channel to indicate the notification channel state is in a new state;
identify a message selector to be associated with the notification channel, wherein the message selector is based on a dimensional channel hierarchy determined as a function of a user for which the notification channel is being created, and wherein the message selector is usable to route web notifications to the notification channel;
create a long poll topic subscription as a function of the message selector;
receive a websocket connection request from the web browser;
transmit an indication of whether the websocket connection request has been accepted
receive a notification request from the web browser;
determine, as a function of the message selector, whether the long poll topic includes one or more messages received from the application integration;
read, in response to a determination that the long poll topic includes the one or more messages, the one or more messages from the long poll topic; and
transmit a response to the web browser that includes the one or more messages.

12. The web notification management platform of claim 11, wherein the one or more processors are further configured to execute the instructions to:

set, in response to a determination that the websocket connection request has been accepted, the notification channel state to indicate the notification channel state is in a websocket state; and transmit, to the web browser, a websocket acceptance response that indicates the websocket connection request has been accepted.

13. The web notification management platform of claim 11, wherein the one or more processors are further configured to execute the instructions to transmit a notification channel creation response indicating the notification channel has been successfully created.

14. The web notification management platform of claim 13, wherein to create the notification channel includes to generate a notification channel identifier usable to identify the notification channel and wherein to transmit the notification channel creation response includes to transmit the notification channel identifier.

15. The web notification management platform of claim 11, wherein the one or more processors are further configured to execute the instructions to:

transmit, to the web browser, a websocket acceptance response that indicates the websocket connection request has not been accepted;

receive a long poll request; and set the notification channel state to indicate the notification channel state is in a long poll state.

16. The web notification management platform of claim 11, wherein the one or more processors are further configured to execute the instructions to:

receive a message from the application integration;

write the received message to a message database of the web notification management platform;

write the received message to a long poll topic; and write the received message to a websocket queue.

17. The web notification management platform of claim 16, wherein the message comprises a web notification to indicate an operation state change event performed by the application integration.

18. The web notification management platform of claim 11, wherein the one or more processors are further configured to execute the instructions to transmit, in response to a determination that the long poll topic does not include the one or more messages, a response to the web browser that is empty.

19. The web notification management platform of claim 11, wherein the one or more processors are further configured to execute the instructions to:

receive a websocket message from the application integration;

queue the websocket message in a websocket queue;

retrieve the websocket message from the websocket queue;

retrieve a list of notification channels associated with a message selector of the websocket message;

determine whether a notification channel state of at least one notification channel of the list of notification channels is in a new state; and write, in response to having determined that not one notification channel of the list of notification channels is in the new state, the received websocket message to the each notification channel of the list of notification channels.

20. The web notification management platform of claim 19, wherein the one or more processors are further configured to execute the instructions to requeue, in response to having determined that at least one notification channel of the list of notification channels is in the new state, the received websocket message to the websocket queue.

* * * * *